April 29, 1947.  M. CONTESSO  2,419,822
METHOD OF TREATING EGG SHELLS TO PRODUCE
A PURIFIED CALCIUM CARBONATE
Filed March 29, 1944
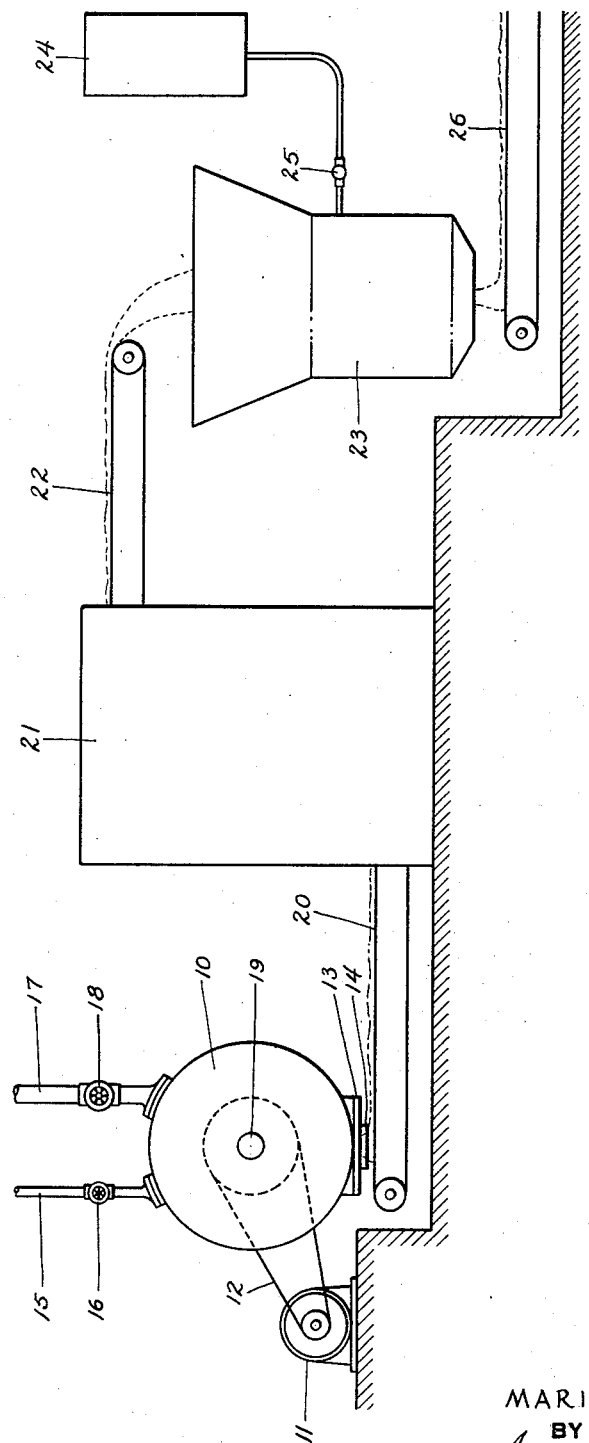
INVENTOR
MARIO CONTESSO
BY
Irving Seidman
ATTORNEY Patented Apr. 29, 1947

2,419,822

UNITED STATES PATENT OFFICE 2,419,822

METHOD OF TREATING EGGSHELLS TO PRODUCE A PURIFIED CALCIUM CARBONATE

Mario Contesso, Astoria, Long Island, N. Y.

Application March 29, 1944, Serial No. 528,648

1 Claim. (Cl. 23—66)

This invention relates to the manufacture of calcium carbonate from egg shells.

Briefly, it is an object of my invention to produce a better and purer grade of calcium carbonate from egg shells by a mechanical method.

I recognize that calcium carbonate has been produced from minerals, such as limestone, chalk, spar, marble, calcspar, coral and limestone. However, egg shells consist for the most part of calcium carbonate of a fine grade and are free from the impurities found in the calcium carbonate of the above-named products.

Calcium carbonate obtained from egg shells by my process can be used for human diet since it is fine and free of germ life and bacteria and is easily assimilated into the human system. It is well known that most diets are short of calcium, milk being the base natural source. Many persons do not like milk and there is not enough milk to supply all the requirements. With calcium carbonate provided by my process many foods can be enriched to provide this necessary ingredient.

This product is used in gas masks, pipe stems, toothpastes and many other products where a fine grade of calcium carbonate is required free of germs and bacteria.

I have, therefore, devised a process to thoroughly purify and wash the egg shells in order to destroy the bacteria germs and remove the albumen and other impurities.

For a fuller understanding of the nature and objects of my process, reference is had to the following detailed description in connection with the accompanying drawings in which the figure represents a diagrammatic scheme of my process.

Referring to the drawing, numeral 10 represents a circular revolving drum which is driven by a motor 11 connected by a belt or a chain 12. Drum 10 has a large covered opening or gateway 13 into which a large quantity of egg shells are dropped when the opening 13 is at its uppermost position. Another covered opening 14, smaller than opening 13, is disposed upon the cover of opening 13 beneath which is a fine screen (not shown). Opening 14 permits the draining or removal of the water while retaining the broken egg shells to remain in the drum 10.

A hot water inlet 15 having a control valve 16 and a hot air inlet 17 with a control valve 18 (diagrammatically shown) lead into the drum 10. Connections, of course, can be made through a hollow shaft 19 of the drum 10.

My preferred method of operation is to revolve drum 10 bringing opening 13 to its upward position. The cover is then opened and a quantity of egg shells are dropped into the drum 10; the cover is then closed. Hot water valve 16 is then opened while the drum 10 is permitted to revolve for about 15 minutes more or less, thus thoroughly washing the egg shells of albumen and other impurities and destroying the bacteria germs. Valve 16 is then closed. In order to more thoroughly mix and break the egg shells within drum 10, a blade (not shown) may be provided within the drum and caused to revolve in a direction opposite to that of the drum. The motor is then stopped and the drum 10 is permitted to revolve and come to a stop with opening 14 in the lowermost position, as shown in the drawings. The cover of opening 14 is then opened permitting the water to drain out of the drum while the screen (not shown) retains the broken egg shells within the drum. When the water has drained off, the cover of opening 14 is closed again and drum 10 is again permitted to revolve. Hot air valve 18 is then opened permitting the hot air to come in contact with the broken egg shells while the revolving blade within the drum thoroughly mixes and further breaks the egg shells, thus completely drying them and destroying additional germ life. Valve 18 is then closed and the motor 11 stopped.

The cover of opening 13 is then opened and the broken egg shells are transported upon conveyor 20 into the ultimate dryer 21 containing additional heat and in which is a lifting conveyor (not shown) to lift the broken egg shells onto upper conveyor 22. Since heated air rises, it is an advantage to provide a lifting conveyor within the ultimate dryer thus providing additional drying during the lifting of the broken egg shells from conveyor 20 to conveyor 22.

Conveyor 22 transports the broken egg shells to a micro-pulverizer 23 which grinds the egg shells to a very fine powder.

In order to insure complete and final destruction of bacteria, I provide an oxygenation apparatus 24 with a control valve 25 leading into the micro-pulverizer. Valve 25 can be opened during the final pulverizing of the egg shells.

A conveyor 26 transports the finished product to the desired place for packing by any desired and well-known method.

In addition to the uses of calcium carbonate aforementioned, my product may be used in fine cements where the fine particles enable it to remain in suspension better than the average filler. In the manufacture of rubber gloves, hot water bottles, bulbs and other rubber items, its high tensile strength and resistance to tear are a decided advantage. In the making of fine coated paper, finely ground calcium carbonate has found application in association with cellulose fibres. Because of its suspensibility, it is used as a neutralizing agent in fermentation processes where control of pH is a factor. It is also used in many water supplies to correct acidity and corrosion by acting as a neutralizing agent. It is also used in soft waters where alum is used as a coagulant. It has other uses, such as, in face powders in which the odor is held by the calcium carbonate to retain the perfume a longer period of time. Also, its use in dog foods for the required calcium content.

My method primarily is that of crushing, washing, drying, sterilizing and pulverizing egg shells, and my preferred equipment above described may be varied to accomplish the end product.

It is evident from the above description of my process that the product manufactured in accordance therewith is inexpensive, economical and can be made in production quantities. The equipment can be of any desired size to provide for the required production.

I claim:

The method of treating egg shells having albumen and other impurities adhering thereto consisting in placing the shells in a drum having internal blades, admitting hot water into the drum, revolving the drum to crush and wash the shells, then stopping the drum and draining the water and impurities therefrom, then closing the drum and again revolving same, then admitting hot air to the drum while revolving, then stopping the drum and removing the crushed shell therefrom, then further drying the shells and finally grinding same while subjected to the action of oxygen to produce a very dry finely pulverized bacteria-free product.

MARIO CONTESSO.

REFERENCES CITED

The following references are of record in the file of this patent:

UNITED STATES PATENTS

| Number | Name | Date |
|---|---|---|
| 1,922,177 | Ryde | Aug. 15, 1933 |
| 2,331,807 | Shea | Oct. 12, 1943 |

FOREIGN PATENTS

| Number | Country | Date |
|---|---|---|
| 26,405 | British | 1896 |